(12) United States Patent
Hitchcock et al.

(10) Patent No.: US 7,086,507 B2
(45) Date of Patent: Aug. 8, 2006

(54) CONTROLLABLE MAGNETO-RHEOLOGICAL ELASTOMER VIBRATION ISOLATOR

(75) Inventors: Gregory H. Hitchcock, Reno, NV (US); Faramarz Gordaninejad, Reno, NV (US); Alan Fuchs, Reno, NV (US)

(73) Assignee: The Board of Regents of the University and Community College System of Nevada on behalf of the University of Nevada, Reno, Reno, NV (US)

( * ) Notice: Subject to any disclaimer, the term of this patent is extended or adjusted under 35 U.S.C. 154(b) by 137 days.

(21) Appl. No.: 10/844,040

(22) Filed: May 12, 2004

(65) Prior Publication Data

US 2005/0011710 A1 Jan. 20, 2005

Related U.S. Application Data

(60) Provisional application No. 60/469,249, filed on May 12, 2003, provisional application No. 60/471,766, filed on May 20, 2003.

(51) Int. Cl.
*F16F 15/03* (2006.01)
(52) U.S. Cl. ............... 188/267.2; 267/140.13
(58) Field of Classification Search ........... 267/140.12, 267/140.13, 140.14, 140.15, 153, 141; 188/267, 188/267.1, 267.2
See application file for complete search history.

(56) References Cited

U.S. PATENT DOCUMENTS

| | | | |
|---|---|---|---|
| 5,290,821 A * | 3/1994 | Sakurai et al. ............. 521/82 |
| 5,505,871 A * | 4/1996 | Harder et al. ............. 252/78.3 |
| 5,547,049 A * | 8/1996 | Weiss et al. ............. 188/267.2 |
| 5,607,996 A | 3/1997 | Nichols et al. ............. 524/439 |
| 5,609,353 A | 3/1997 | Watson ....................... 280/707 |
| 5,814,999 A | 9/1998 | Elie et al. ................... 324/662 |
| 5,816,587 A * | 10/1998 | Stewart et al. ........... 280/5.516 |
| 5,974,856 A | 11/1999 | Elie et al. .................. 73/11.04 |
| 6,544,156 B1 | 4/2003 | Anderson ..................... 492/8 |
| 2004/0074061 A1 | 4/2004 | Ottaviani et al. ............. 24/442 |

FOREIGN PATENT DOCUMENTS

WO WO 02/090105 11/2002

OTHER PUBLICATIONS

Demchuk, S.A. and Kuz'min, V.A. (2002), "Viscoelastic Properties of Magnetorheological Elastomers in the Regime of Dynamic Deformation," Journal of Engineering Physics and Thermophysics. 75(2):396-400.
Ginder, J.M. (1996), "Rheology Controlled by Magnetic Fields," Encyclopedia of Applied Physics. 16:487-503.
Ginder, J.M. et al. (1996), "Magnetorheological Elastomers: Properties and Applications, Smart Materials Technologies," ed. by M. Wuttig, Proc. of SPIE. 3675:131-137.
Walsh, P.L. and Lamancusa, J.S. (1992), "A Variable Stiffness Vibration Absorber for Minimization of Transient Vibrations," Journal of Sound and Vibration. 158(2):195-211.

* cited by examiner

*Primary Examiner*—Matthew C. Graham
(74) *Attorney, Agent, or Firm*—Greenlee, Winner & Sullivan, P.C.

(57) ABSTRACT

A tunable vibration isolation device comprising a magneto-rheological elastomer (MRE), and methods of using such a device, are provided. By manipulating a magnetic field within the MRE the device's stiffness is controlled. The vibration isolator can be constructed to provide shock absorption in one, two and three dimensions. Coupling the tunable device to a sensor feedback and a control system provides fast and accurate vibration isolation and energy dissipation for shock events in a variety of applications.

28 Claims, 5 Drawing Sheets

CONTROLLABLE MAGNETO-RHEOLOGICAL ELASTOMER VIBRATION ISOLATOR

CROSS REFERENCE TO RELATED APPLICATIONS

This application claims priority from U.S. Provisional Application Nos. 60/469,249 filed May 12, 2003, and 60/471,766 filed May 20, 2003, which are incorporated herein by reference to the extent not inconsistent herewith.

FIELD OF INVENTION

The present invention pertains to a method and device for varying the stiffness and damping capacity of a magneto-rheological elastomer (MRE) based on the operating state of the device.

BACKGROUND OF THE INVENTION

Magneto-rheological elastomers (MREs) are elastomer composites that can be used in a variety of applications for vibration isolation and energy dissipation. The basic principle of MREs is that manipulating the magnetic field exerted on the MRE can control their stiffness and their damping capacity. Increasing the magnetic field inside the MRE causes the stiffness of the MRE to increase. Without wishing to be bound by any particular theory, it is believed that an increase in MRE damping capacity will be coupled to an increase in stiffness. Thus, by matching the magnetic field in the MRE to the external forces acting on the MRE, it is possible to regulate the MRE's stiffness to best tune a response to vibrational forces exerted on the MRE.

An MRE is comprised of an elastomeric host or carrier material filled with iron or other magnetizable particles. The addition of magnetizable particles to the carrier produces an elastomer whose mechanical properties can be rapidly and continuously controlled with an applied magnetic field. The strength of an MRE can be characterized by its field-dependent modulus (modulii). A MRE is a field-controllable material with tunable stiffness and damping characteristics, which makes it useful for vibration isolation and damping applications.

If a magnetic field is applied to the elastomer during curing and the particles are able to move through the host medium, the magnetic particles orient into chains or columns parallel to the direction of the magnetic field (Ginder, J. M., Nichols, M. E., Elie, L. D., Tardiff, J. L., (1999), "Magnetorheological Elastomers: Properties and Applications, Smart Materials Technologies," Ed. by M. Wuttig, Proc. of SPIE Vol. 3675, 131–137). As the elastomer cures, the aligned magnetic particles are locked into place and are ready for activation when installed in a device that can energize the material with a magnetic field. Under the influence of a magnetic field, dipole moments are induced in the magnetic particles resulting in an increase or decrease in stiffness and damping of the composite material depending on magnetic field strength.

A variety of elastomers have been proposed as carrier materials for magneto-rheological elastomers. Ginder et al. describe MREs having micrometer-sized carbonyl iron particles embedded in natural rubber (Ginder, J. M., Nichols, M. E., Elie, L. D., Tardiff, J. L., (1999), "Magnetorheological Elastomers: Properties and Applications, Smart Materials Technologies," Ed. by M. Wuttig, Proc. of SPIE Vol. 3675, 131–137). Shiga et al identify rubber as a carrier material (English abstract of Japanese publication 04-266970, English abstract of Japanese publication 05-025316A). Elie et al (U.S. Pat. No. 5,974,856) list natural rubber, silicone, polybutadiene, polythethylene, polyisoprene, polyurethane and the like as elastomeric carrier materials. Viera et al. (WO 02/09015) list natural rubber, silicone, polybutadiene, polyethylene, styrene butadiene rubber (SBR) nitrile rubber, polychloroprene, polyisobutylene, synthetic polyisoprene, and blends thereof as elastomeric carrier materials. Ottaviani et al. (U.S. Publication 2004/0074061) list elastomeric polymer matrices of polyalpha-olefins, natural rubber, silicone, polybutadiene, polyethylene, polyisoprene, polyurethane, and the like.

MRE-based devices can be used in mechanical systems to mitigate shock events and in civil infrastructure to mitigate seismic and natural hazards as well as to protect infrastructure from man-made hazards. This family of devices can be used in optical applications, mechanical systems, automotive engine mounts, suspension systems, rotating shaft vibration isolation, sensitive equipment mounts, and manufacturing automation systems that require vibration isolation to improve production performance. Any system that is subjected to random shock events can benefit from a controllable/tunable vibration isolator and energy dissipater. The device of the present invention combines a controllable MRE device, shaped to any geometry, with a feedback control system to insure the desired device response to a given shock event is optimized for maximum damping and vibration isolation.

MRE-based devices have been used in automotive bushings to improve vehicle ride and handling performance. Watson (U.S. Pat. No. 5,609,353). Watson discloses generating an electrical current to a single electrocoil based on a transmission state signal such that the bushing stiffness is related to the transmission state. However, the bushings in Watson are limited to a magnetic field in the radial direction generated by a single electrocoil. Thus, the MRE device is constrained to damping vibration between annular cylinders. The present invention addresses the need in the art for MRE devices useful for various geometries and a variety of applications beyond automotive bushings. The present invention addresses this need, in part, by using multiple magnetic nodes such that the MRE can be used to damp vibration and dissipate energy from any direction that the external force is applied.

SUMMARY OF THE INVENTION

The invention provides MRE devices and methods for their use for vibration isolation by changing the storage and loss modulii of one or more MRE layers.

The type of MRE and how it is processed is constrained by the vibration force to be dissipated by the MRE device. Thus, embodiments of the present invention can include a wide variety of MREs known in the art so long as their stiffness under an applied magnetic field is sufficient for the particular vibration isolation and damping requirement. Preferred MRE and MRE processing methods are disclosed in Patent Application 60/471,766 filed May 20, 2003, "Tunable Magneto-Rheological Elastomer," Fuchs, Gordaninejad and Hitchcock, as discussed hereinbelow and hereby incorporated by reference.

The MRE can be sandwiched between magnetic activation layers. The magnetic activation layers can contain embedded magnetic nodes that control the magnetic field, and thus the stiffness, of the MRE. These magnetic nodes can comprise electromagnets as well as a combination of electromagnets and permanent magnets. The current and voltage supplied to the electromagnets will affect the magnetic field strength within the MRE and, hence, the stiffness of the MRE. The current and voltage are determined by the external vibration and associated forces imparted to the MRE device. Thus, embodiments of the present invention include detecting, measuring and signaling one or more physical manifestations of these external forces, and transforming this signal into the appropriate current and voltage to send to the magnets to obtain optimal vibration isolation energy dissipation for a given shock event.

The magnetic activation layer can be comprised of elastic materials (including an MRE material), inelastic materials, or a combination thereof. A material is elastic if it deforms under an applied stress. The magnetic nodes need not be located within the magnetic activation layer. The locations of the magnetic nodes are constrained by their ability to impart a magnetic field to the MRE to affect a change in the MRE's stiffness and damping. Because the magnetic field strength decreases with increasing distance from the magnetic source, embodiments of the present invention have magnetic nodes contained within the magnetic activation layer and within the MRE layer.

Alternative embodiments of the invention comprise additional magnetic nodes located within the MRE layer. Such nodes can function to increase and focus the magnetic field within the MRE. Alternatively, nodes within the MRE layer can act to dissipate the magnetic field within the MRE layer.

In addition, the MRE devices of the present invention can be constructed in various configurations including "beam," "plate," and "shell" to provide vibration isolation and shock absorption for various types of geometrical situations.

The present invention also includes multiple MRE devices connected in parallel, series, or a combination thereof to achieve required performance characteristics. By connecting individual MRE devices in this manner an individual MRE device, with a limited range of stiffness and sensitivity, can be connected to other MRE devices to expand its operational range and increase its stiffness sensitivity in different operating ranges in a manner similar to connecting multiple traditional passive springs together in series, in parallel and in combinations thereof.

This invention also includes methods of using the claimed MRE devices for vibration isolation of mechanical systems for random shock events.

DETAILED DESCRIPTION OF THE INVENTION

Figure 1:
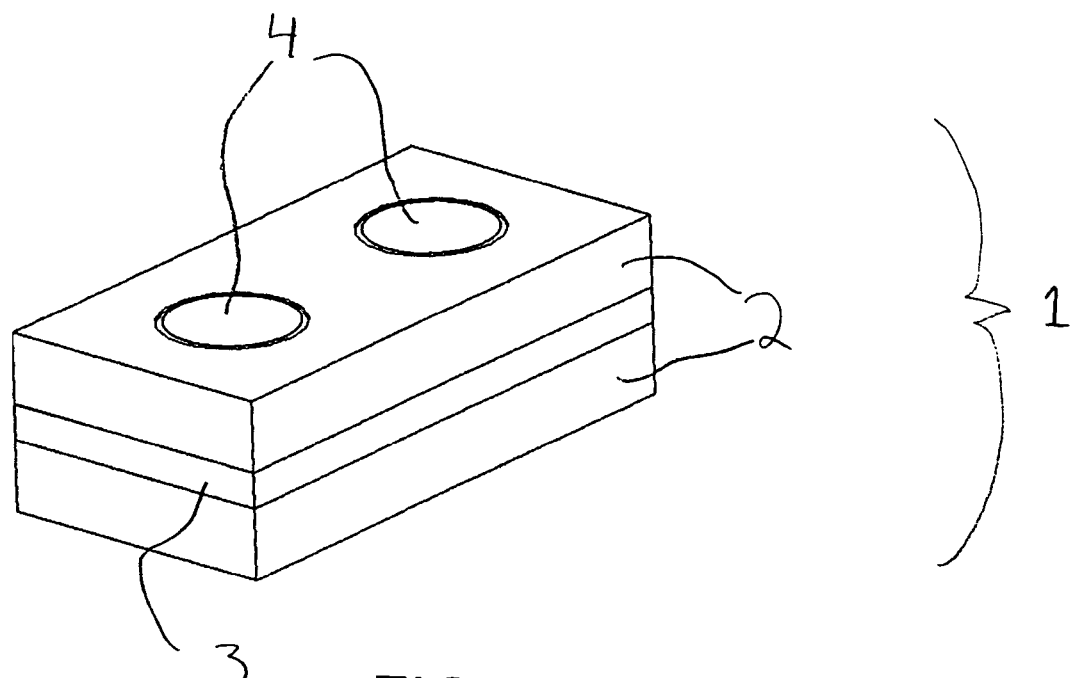
FIG. 1 shows an MRE device in a beam configuration.

As used herein magneto-rheological elastomers (MRE) are elastomers in which magnetizable particles are embedded. The elastomer may comprise any suitable elastomer of silicone, rubber, polyethylene, polyurethane or the like, as known to the art. Magnetizable particles are embedded within the elastomer such that under an applied magnetic field the particles become magnetized. Generally, the MRE is produced by dispersing the particles in a liquid-elastomer precurser under a magnetic field of uniform magnetic flux, followed by curing. The MRE is a composite material whose mechanical properties can be manipulated by means of an applied magnetic field.

Any type of particle that is magnetizable by a magnetic field can be incorporated into the MRE. These particles can include those exhibiting paramagnetic, ferrimagnetic, or ferromagnetic properties. Examples of paramagnetic particles include compounds comprising oxides, chlorides, sulfates, sulfides, hydrates, and other organic or inorganic compounds of cerium, chromium, cobalt, dysprosium, erbium, europium, gadolinium, holmium, iron, manganese, neodymium, nickel, praesodymium, samarium, terbium, titanium, uranium, vanadium, and yttrium. Paramagnetic elements and alloys include gadolinium, various stainless steels, and other alloys of iron, nickel, manganese, and cobalt, with or without other nonmagnetic elements. Ferrimagnetic particles include magnetite ($Fe_3O_4$) and other compounds of iron and oxygen, and a third metallic component. Ferromagnetic materials include iron, nickel, and cobalt, as well as alloys of these and other materials. Preferably, the elastomer of the present invention comprises ferrous particles.

The size of the magnetizable particles embedded within the elastomer can vary widely, such as, for example, from about 0.1 to about 200 microns, preferably from about 1 to about 10 microns, and more preferably from about 3 to about 5 microns. In an embodiment, the magnetizable particles are carbonyl iron particles. In this embodiment, iron purities are from about 95 to about 99.9%, preferably from about 97 to about 99.8%, and more preferably from about 99.5 to about 99.8%, where carbon content is minimized. In other embodiments, the magnetizable particles are alloy particles such as cobalt-iron alloys and stainless steel alloys.

Magnetic particles may be present at between about 10 to about 95% by weight of the material. The amount of magnetic particles in the MRE layer should be sufficient to provide the required on-state mechanical properties, preferably 30 to 90 percent by weight, more preferably 50 to 80 percent by weight, based on the total weight of the MRE layer. In an embodiment the magnetic activation layer can be an MRE with a higher percent weight of magnetizable particles than that found in the MRE layer. In another embodiment, the magnetizable particles are ferrous flakes, wherein the flake is not spherical.

The embedding host material for the particles can be any substantially nonmagnetic viscoelastic solid material. MREs suitable for use in the invention include those with matrices/carriers of natural or synthetic rubber. Synthetic rubbers include polybutadiene, styrene butadiene, nitrile rubber, polychloroprene, polyisoprene, silicone, and fluroelastomers. Suitable MREs also include those with carriers of polyethylene, polyisobutylene, hydrocarbon polyol based urethanes, and blends of silicone and polyurethane. The hydrocarbon polyol based urethane can be prepared by reaction of a hydrocarbon polyol with a polymeric diisocyanate. Polybutadiene polyol based polyurethane can be produced by a reaction of hydroxyl terminated polybutadiene, of functionality greater than 2, with polymeric MDI isocyanate. (see "Sartomer Products for Urethane Elastomers." Sartomer, 502 Thomas Jones Way, Exton, Pa. 19341. Available at: http://www.sartomer.com/wpapers/1560.pdf. Accessed May 12, 2004). Blends of the above-listed carriers may also be suitable. Suitable MREs also include those with carriers of thermoplastic elastomers, including polyolefins (poly-alpha-olefins), styrenics, polyamide polymethacrylate copolymers, isobutenic block copolymers, polyetherblock amides, polyetherurethanes, hydrocarbon-polyol polyurethanes and ionomers.

The MRE materials of the invention are made by mixing the magnetizable particles with the elastomer and applying a magnetic field to the material while the elastomer cures or solidifies. The magnetizable particles may be mixed with the elastomer by mixing the particles with one part of the elastomer, and then mixing in the other parts of the elastomer. For example, in making a polyurethane-silcone polymer blend, the magnetizable particles can be mixed with a mixture of a chain extender and one part of a two-part silicone resin. This mixture can then be combined with a mixture of an isocyanate and the second part of the two-part silicone resin. Another example for making a hydrocarbon polyol based urethane, the magnetizable particles can be mixed with the polyol, then this mixture combined with the diisocyanate.

The process of orienting and aligning the magnetic particles during elastomer cure or solidification is important for producing MREs with controllable behavior. A magnetic field of uniform magnetic flux is passed through the MRE in a direction that is desirable for the final device application for a period of time sufficient to allow the base matrix to solidify, locking the aligned magnetizable particle chains into place. If the device is to dissipate a purely compressive force, the particles are optimally aligned in a direction parallel to the compressive force. If the device is to dissipate a purely shear force, the particles are optimally aligned in a direction perpendicular to the compressive force. If the device is to compensate both compressive and shear forces simultaneously, the optimal direction of particle alignment is between the direction parallel and perpendicular to the compressive force. For thermosetting polymers, the solidification preferably takes place in a compression or reaction injection mold. For thermoplastic elastomers, the curing preferably takes place in a compression or injection mold.

The particular MRE properties, including elastomer type, particle type and amount contained within the elastomer, as well as the particular method whereby the liquid-elastomer precurser is solidified, will depend on the magnitude and frequency of the vibrational force the device is meant to dissipate. As used herein, vibrational force refers to the shock event transmitted to the inertial reference frame. If the device is to encounter large vibrational forces, the MRE must have the ability to become stiffer than an MRE in a device subjected to lower magnitude vibrational forces. Similarly, the resonant frequency of a mechanical system will also guide one of ordinary skill in the art in choosing the MRE and processing of the MRE therein. General methods of manufacturing MREs with particular physical characteristics are known in the art. Ginder, J. M. (1996), "Rheology Controlled by Magnetic Fields," Encyclopedia of Applied Physics, Vol. 16, pp. 487–503. Preferred MRE and MRE processing methods are disclosed in Patent Application 60/471,766 filed May 20, 2003, "Tunable Magneto-Rheological Elastomer," Fuchs, Gordaninejad and Hitchcock, hereby incorporated by reference.

The magnetic activation layer refers to the upper and lower layers adjacent to the MRE layer. See, e.g. FIGS. 1 and 3. The magnetic activation layer can be bonded to the MRE layer by a suitable adhesive and can be the same base elastomer medium of the MRE layer. The magnetic activation layer can be elastic to permit the MRE device to deform under an applied magnetic field. Alternatively, the magnetic activation layer can be composed of a relatively inelastic material such that MRE device only deforms by shearing the MRE layer when a magnetic field is applied. In such situations, it is the increase in loss modulus of the inner MRE layer alone that affects vibration isolation and energy dissipation. The magnetic activation layer can also be composed of MRE material. In an embodiment, the magnetic activation layer is an MRE with a higher magnetic particle fraction than the MRE layer.

The magnetic nodes can be located outside, within, or outside and within, the magnetic activation layer. However, because the magnetic field strength decreases with increasing distance from a magnetic source, a preferred embodiment of the present invention has the magnetic nodes within the magnetic activation layer. The magnetic activation layer can contain and hold magnetic nodes adjacent to the MRE. The magnetic activation layers also protect and support the MRE layer and assists in stacking the MRE devices of the present invention in series. The MRE device can also contain an MRE layer that encloses the outermost magnets to provide a complete magnetic return path or closed magnetic circuit within the device magnetic circuit. Such a return path ensures maximum device efficiency. In the applications where the MRE device is rigid, this return path can be accomplished by an inelastic magnetic material such as low carbon steel. An embodiment of the present invention comprises magnetic activation layers comprised of magnets and high volume fraction of ferrous material or magnetically conductive material such that the MRE device remains flexible. An additional encasement layer to provide any needed additional stiffness and environmental protection if the device is operated in corrosive or abrasive conditions can then protect this outermost MRE layer. This layer is called the "external encasement layer." This layer can be made of any material that provides environmental protection. The encasement layer can be made of a material including metals, plastics or the elastomer carrier of the MRE (but the magnetic particles need not be present).

As used herein, "magnet" or "magnetic node" refers to any device that can generate a magnetic field or modify a pre-existing magnetic field. Thus, the term encompasses permanent magnets and electromagnets. The particular strength of a given magnet will depend on the MRE characteristics as well as the range of energies and vibrational forces to be stored/dissipated by the vibration isolator MRE device.

A magnet is "operably connected to" or "operatively associated with" the MRE when the magnetic field generated by the magnet results in a change in the stiffness of the MRE. Thus, the present invention includes magnets positioned anywhere in the device so long as the magnets can affect a change in the MRE stiffness. The presence of a magnetic field causes the MRE to become "activated." An MRE is said to be activated when its stiffness in any location within the MRE has increased due to the presence of a magnetic field. The stiffness of an MRE is a measure of the MRE's storage and loss modulii. Storage and loss modulii are material properties that universally describe the material's ability to store and dissipate energy, respectively. A Dynamic Mechanical Analyzer is an instrument that can measure these properties. Thus, when current is sent through an operably connected electromagnet, the MRE becomes stiffer because of the interaction of the magnetic field with the embedded magnetic particles. As the current to the electromagnet increases, the strength of the magnetic field increases, which increases the stiffness of the MRE as well as increasing the damping capacity of the MRE. If the current to the electromagnet is turned off, the MRE stiffness returns to its resting, baseline or off-state level.

A vibration force is a time variable force exerted onto a MRE device that is connected to an inertial reference frame. A vibration force can be generated by a shock event or a mechanical disturbance. The advantage of the MRE device is its ability to rapidly change its stiffness under the control of a rapidly changing magnetic field. The ability to tune stiffness in response to a vibration force results in the MRE device functioning as a vibration isolator when it is connected between an inertial reference frame and the vibration force. The inertial reference frame is the object to which the MRE device is attached such that the object is isolated from the shock event and associated vibration. The presence of the MRE device minimizes the vibration force and associated displacement that is transmitted to the inertial reference frame by the shock event. Vibration isolation refers to the action of the MRE device whereby changes in the MRE layer's stiffness decreases the effect of the vibration force on an isolated mechanical system to which the MRE device is connected.

Multiple MRE devices can be connected in series, in parallel, or in combinations thereof. MRE devices are in series when they are stacked on top of one another between the inertial reference frame and the vibration force (see FIG. 6). MRE devices are in parallel when they are connected end-to-end between the inertial reference frame and the impinging vibration force.

Because the MRE has an inherent stiffness even without any magnetic field ("off-state level" or baseline stiffness), the MRE devices of the present invention have a passive (or fail-safe) level of performance in the event of control system failure. The off-state level of stiffness can be manipulated with the use of permanent magnets whose magnetic field, unlike electromagnets, is not dependent on an external power source. Off-state stiffness can also be increased by choosing elastomeric carriers and curing processes such that the MRE has a relatively stiff off-state relative to other MREs.

Preferably there is a plurality of magnets contained within a single MRE device. An embodiment of the present invention contains coupled magnetic nodes facing each other on either side of a MRE layer that can either attract one another (e.g. top layer's magnets create a north pole and bottom layer's magnets create a south pole, or vice versa) or, alternatively, repel one another. This can be accomplished by means of an intelligent control system that controls the current's direction in the electromagnet depending on the magnitude and location of the external load. Using coupled magnetic nodes results in a stronger internal magnetic field within the MRE. In addition, a magnet can also be placed within the MRE layer itself to further increase (or decrease) the internal magnetic field, thereby increasing (or decreasing) the stiffness of the MRE device. Such use of a plurality of coupled magnetic nodes creates a controllable three-dimensional magnetic field that can be tuned for specific vibration isolation requirements. A "non-uniform" magnetic field is generated by electromagnets of different magnetic strengths simultaneously affecting the magnetic field within an MRE layer.

The magnets contained within the MRE devices of the present invention permit the device to dissipate vibrational energies in shear or compression or both. A force parallel to the preformed ferrous particle chain is said to be in compression or tension and a force perpendicular to the particle chain is in shear (see FIG. 4). The use of multiple magnetic nodes allows the MRE devices of the present invention to respond to both shear and compressive loads. The use of multiple nodes allows the MRE device to be optimized for shear and compressive vibrational energy dissipation. A device with only one magnetic node is limited to respond to only one primary direction of deformation.

A feedback system can be used comprising one or multiple sensors to detect external compressive and shear forces. The use of sensors that measure and convert a physical quantity into an electrical signal are known in the art. See, e.g., Horowitz, P. and Hill, W., (1989), "The Art of Electronics." pp. 987–1041. The physical quantity can include, pressure, displacement, acceleration, velocity, force, strain, temperature and light, for example. Any electrical quantity that can be processed by electronic circuits is suitable, including voltage, current and pulse width or frequency. As is known in the art, there are a multitude of sensors available to detect many different physical quantities and a multitude of methods by which the electrical quantity output by one or more sensors can be manipulated such that an appropriate current or voltage is sent to the electromagnets which in turn affects the MRE stiffness. Horowitz, P. and Hill, W., (1989), "The Art of Electronics."

As used herein, force or vibration force refers to the shock or vibration force impinging or imparted on an inertial reference frame, and which the MRE device seeks to dissipate when interposed between the force and the inertial reference frame. The MRE device comprises one sensor that measures this force, either directly or indirectly. Sensors are known and available in the art to directly measure a force or pressure impinging the MRE device. However, the force can be manifested in a number of different measurable physical quantities including magnitude and direction of displacement, velocity and acceleration of the MRE device. In addition, the frequency of the vibration force can also be detected. Sensors can be employed to convert one or more of these variables into an electrical signal, communicate these one or more signals to an intelligent controller that will then determine the appropriate current and voltage to send to the electromagnets to obtain an optimal MRE-stiffness.

The controller can be any device that can determine from one or more input signals the appropriate level of current and voltage a power supply should send to the MRE device. Those skilled in the art will recognize there are many methods to accomplish this. For example, the controller can comprise an input-output circuit, central processing unit, random access memory and read-only memory components. The input-output circuit exchanges data with external devices, including the sensors, so that a vibrational force impinging on the device is converted to an electrical signal that can be communicated to, and processed by, the central processing unit. A program that determines the appropriate output current and voltage a power supply should supply the electromagnets for various input signals can be stored in the read-only memory that the processor accesses. The random access memory can store data while the data is processed and can also store data about the MRE device history (e.g. number and magnitude of stiffness changes), age, surrounding environment (temperature, humidity, chemicals, for example) and present performance. These data can also be sent to the processor and compensated for when the appropriate current and voltage generated by the power supply and communicated to the electromagnets is calculated.

Calibration of the MRE devices of the present invention can be conducted empirically by applying a known physical quantity to the device and measuring the appropriate current to be sent to each of the magnets of the MRE device to compensate for the applied physical quantity. Such calibrations permit the controller to be programmed to send an appropriate electrical signal from the power supply to the MRE device that is dependent on the input signal. Therefore, such MRE devices, once appropriately calibrated and programmed, can function independently of user control and can automatically control the stiffness of the MRE to compensate for any given vibrational force.

Tunable MRE devices can also compensate for device degradation whereby the off-state stiffness can change over time due to a variety of factors including aging and/or chemical degradation of the elastomer due to adverse environmental conditions.

Beam Configuration

The simplest geometry of the present invention is a beam configuration as shown in FIGS. 1–3, 6 and 7. In a beam configuration the magnetic nodes 4 are aligned along a single axis. FIG. 1 shows a MRE sandwich structure device 1 with magnetic activation layers 2 that encase the inner MRE layer 3. In this embodiment two magnetic nodes 4 are visible in the upper magnetic activation layer.

Figure 2:
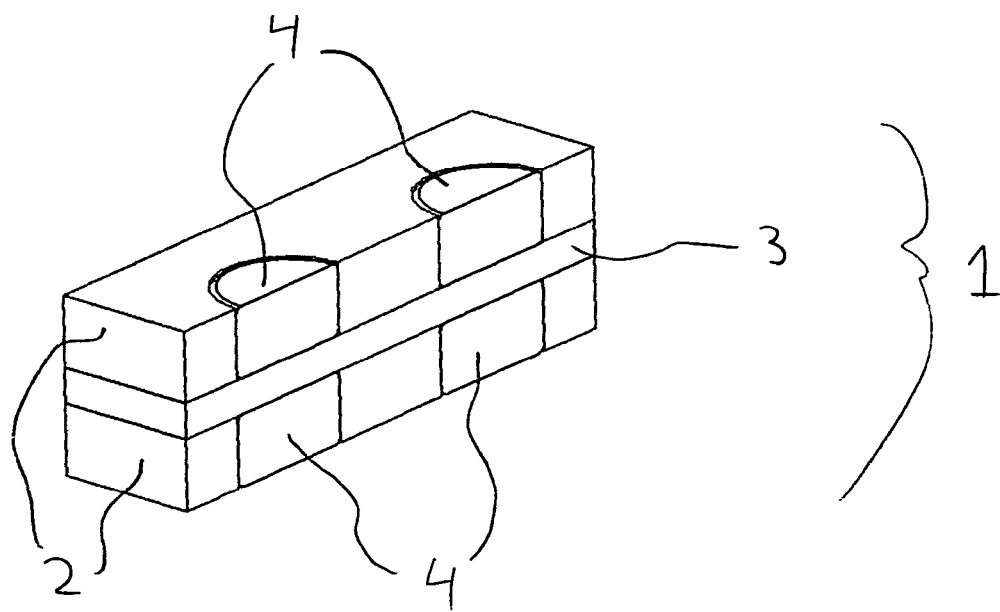
FIG. 2 shows a sectional view through the magnetic nodes of an MRE device with two magnetic activation layers.

FIG. 2 is a section view through the midplane of FIG. 1 to show that the magnetic nodes 4 can be paired to either increase the magnetic field strength in the MRE layer 3 or to cancel the magnetic field within the MRE layer 3 depending on the polarity of each of the magnetic nodes. If the magnetic activation layer is relatively firm, the MRE device can only deform in shear under an applied magnetic field. However, if the magnetic activation layers are relatively soft, the MRE device can deform in all directions.

Figure 3:
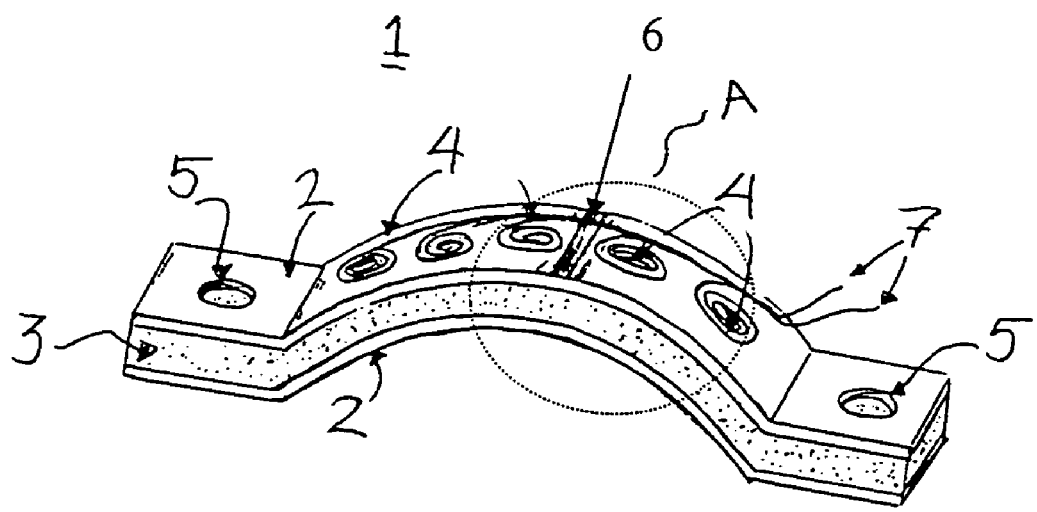
FIG. 3 is an isometric view of an MRE device in a curved beam configuration.

FIG. 3 builds on the beam configuration of FIGS. 1 and 2. Although the general configuration remains the same, with the MRE layers 3 sandwiched between the magnetic activation layers 2, additional magnetic nodes 4 are shown and the beam is curved. A beam is "curved" when any portion of the MRE layer, without an applied magnetic field present in the MRE layer, is significantly displaced vertically from another portion. The magnetic nodes 4 are electromagnets connected to electrical leads 7 carrying the current to energize the electromagnets. Mounting holes 5 secure the MRE device 1 to an inertial reference frame not pictured. The crest of the MRE device 6 provides point of contact for the impinging vibrational force not pictured.

Figure 4:
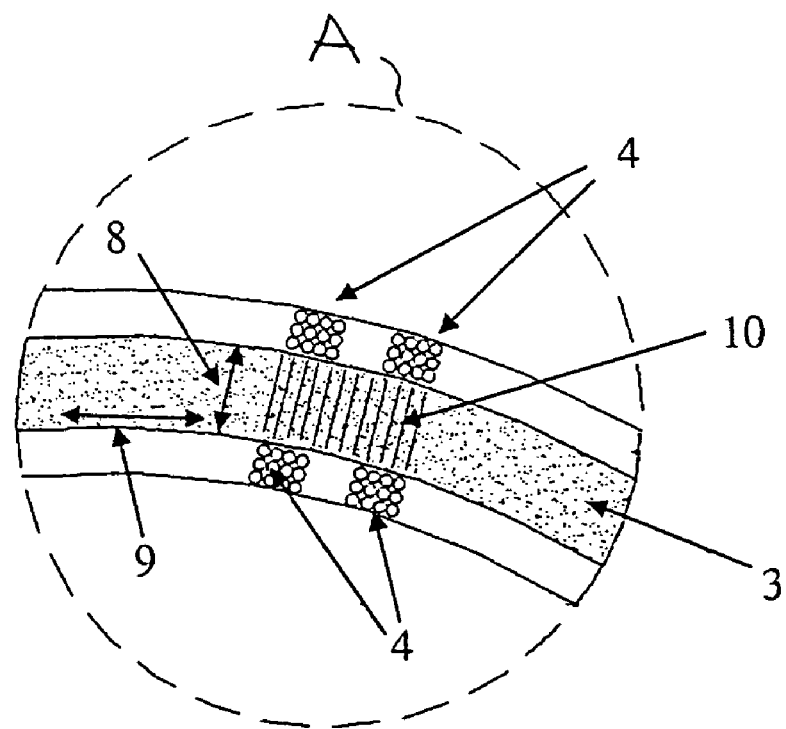
FIG. 4 shows an enlarged view of an electromagnet activation node labeled "A" in FIG. 3.

FIG. 4 is a detailed cross-sectional view of the region labeled "A" in FIG. 3. A magnetic node pair 4 is shown in FIG. 4 activating a local MRE material region 3. When the magnetic nodes 4 are energized, the MRE material 3 is activated. Such curved configurations are particularly advantageous because the MRE material 3 can be displaced in compression 8 and in shear 9, the displacement being dependent on the controllable material stiffness as a function of magnetic field strength 10. The magnetic nodes 4 can be either electromagnets or permanent magnets but are shown here as the wires of the electromagnets going into and out of the page. These nodes 4 generate a magnetic flux and associated magnetic field strength 10. The magnetic field-dependent stiffness and damping characteristics can be controlled by varying the magnetic field strength 10 by changing the input current to the electromagnet 4. Changing the direction of the current to one of the electromagnets 4 can cause the magnetic force within the MRE material 3 to change direction.

Figure 5:
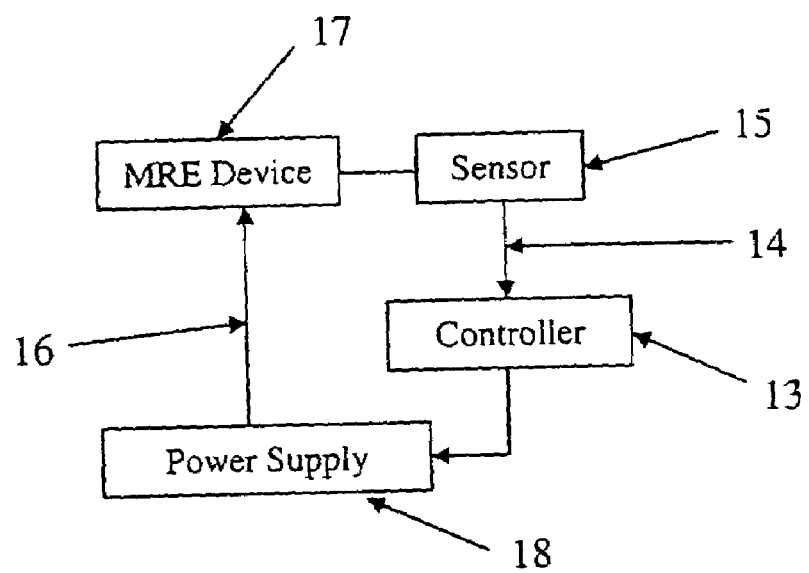
FIG. 5 is a block diagram schematic to show how the feedback signal from a sensor can be used to determine an appropriate signal to the MRE device from a power supply.

FIG. 5 shows a mechanical system block diagram that incorporates a controller 13 that utilizes a feedback signal 14 from a sensor 15 to determine the appropriate current 16 to the MRE device 17 from a power supply 18. The sensor detects the vibrational force exerted on the MRE device. The sensor is not restricted to only detecting a force. It can also measure other physical quantities that the vibrational force affects such as displacement, velocity, acceleration, pressure and the like. Another embodiment of the present invention is to have multiple sensors and multiple currents controlled by one or more intelligent controllers such that individual electromagnets can receive different levels of current and thereby provide a magnetic field that is dependent on the spatial coordinates within the MRE layer. The intelligent controller can receive other signals to compensate for device aging, history and deterioration. For example, the number and magnitude of MRE stiffness changes, as well as age of the MRE device, can be recorded on a programmable chip that then sends a signal to the controller to affect a change in the electrical signal to the electromagnets. In this manner, the natural stiffening of an elastomer with age can be compensated for.

Figure 6:
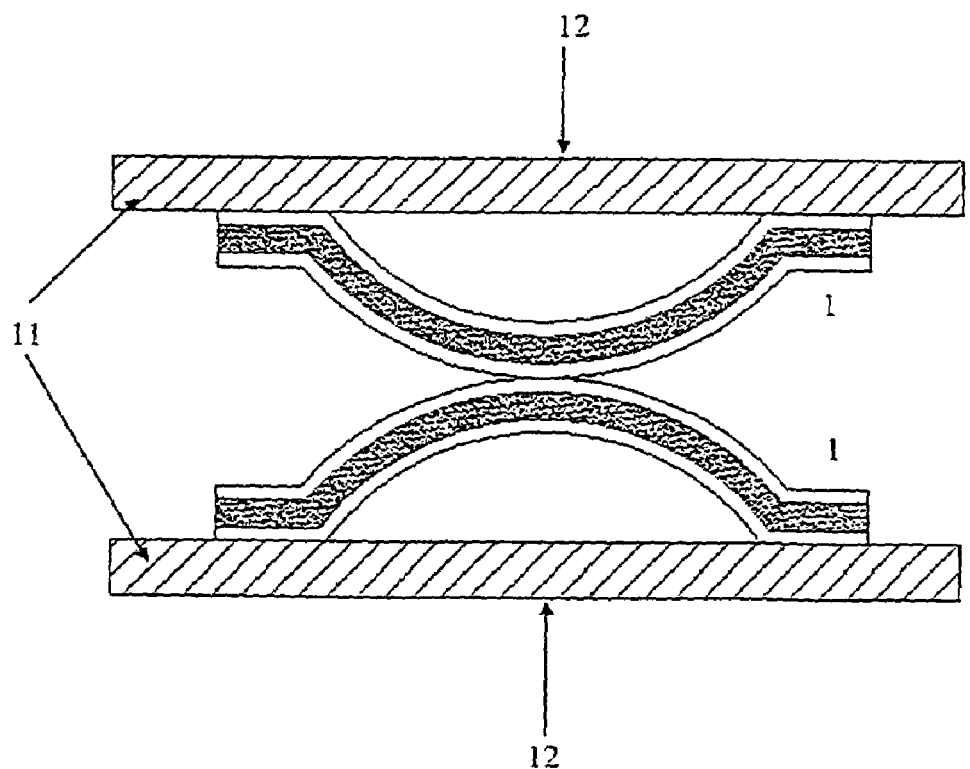
FIG. 6 shows two curved beam MRE devices connected in series being compressed between two inertial references by an externally generated load.

FIG. 6 shows that MRE devices can be combined in different configurations; in this case two MRE devices 1 are shown connected in series. The two MRE devices 1 are compressed between two inertial references 11 by external load 12. Similarly, the devices 1 can be connected in parallel. Connecting MRE devices in parallel provide a larger surface area of damping. In addition, parallel configurations increase baseline stiffness as for traditional springs hooked together in parallel.

Figure 7:
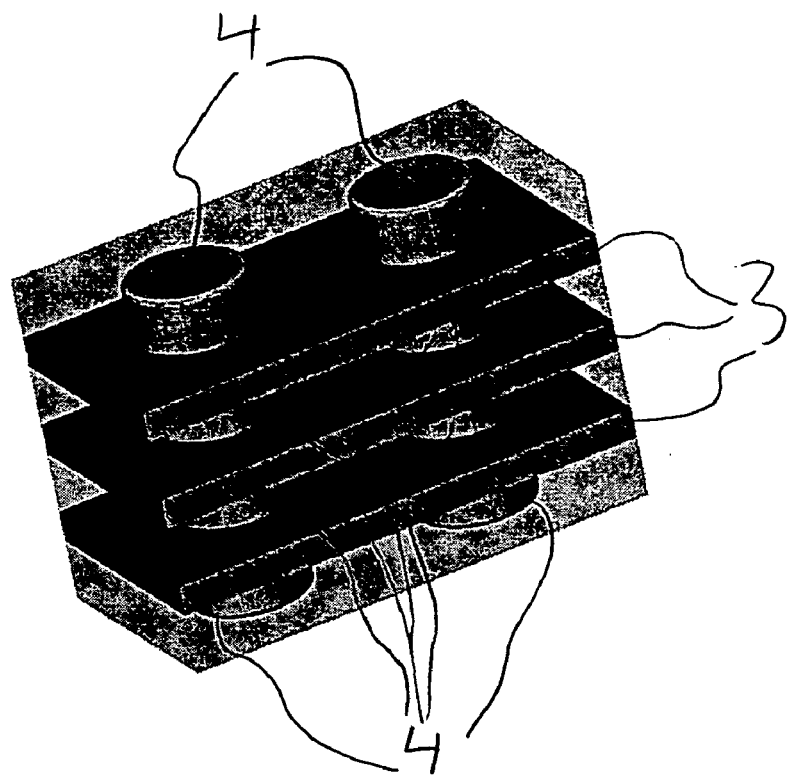
FIG. 7 shows an MRE device having a beam configuration with four magnetic activation layers configured in series with the magnetic activation layers not shown to show the location of the magnetic nodes.

FIG. 7 shows a beam configuration with three MRE layers 3, and associated magnetic nodes 4 contained within the magnetic activation layers (not shown), connected in series. The magnetic activation layers are not shown so that the internal magnetic nodes 4 can be seen. Additional MRE devices can also be connected in parallel as well as combinations of series and parallel. In a series connection the MRE devices are "stacked" on top of one another. In a parallel configuration the MRE devices are placed end-to-end.

The scope of the claimed invention also encompasses unpaired magnetic nodes as well as magnetic nodes that are contained within the MRE layer 3.

Plate Configuration

Figure 8:
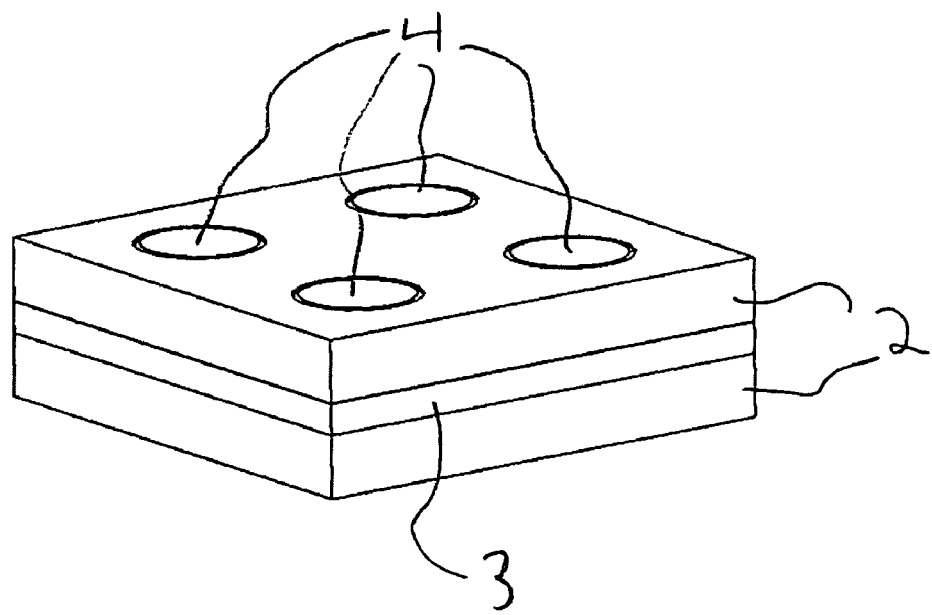
FIG. 8 shows an MRE device having a plate configuration with two magnetic activation layers.

The magnetic nodes can also be located on two-dimensions (plate configuration) instead of the one-dimensional beam configuration discussed above. FIG. 8 shows an example of the plate configuration with two magnetic activation layers 2, each containing magnetic activation nodes 4, encasing the MRE layer 3.

Figure 9:
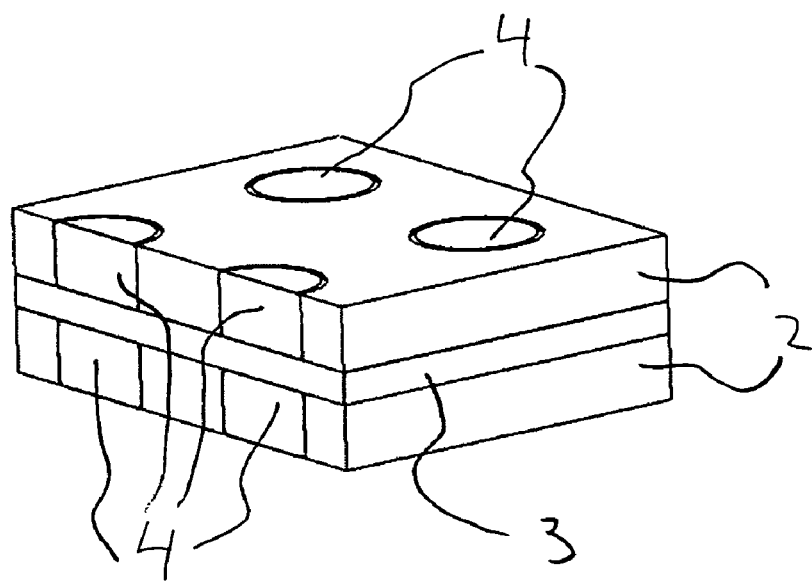
FIG. 9 shows a sectional view of FIG. 8 through four of the magnetic activation nodes.

FIG. 9 is a section view of FIG. 8 to show the paired magnetic nodes 4. An intelligent controller system as discussed above with respect to FIG. 5 can control the current to each of the electromagnets 4. The current's magnitude for each electromagnet depends on the magnitude and location of the force applied to the MRE-plate. The current, and hence the magnetic field strength within the MRE layer 3, is optimized to provide maximum vibration isolation and energy dissipation. Different regions of the MRE layer 3 can have different magnetic field strength.

Figure 10:
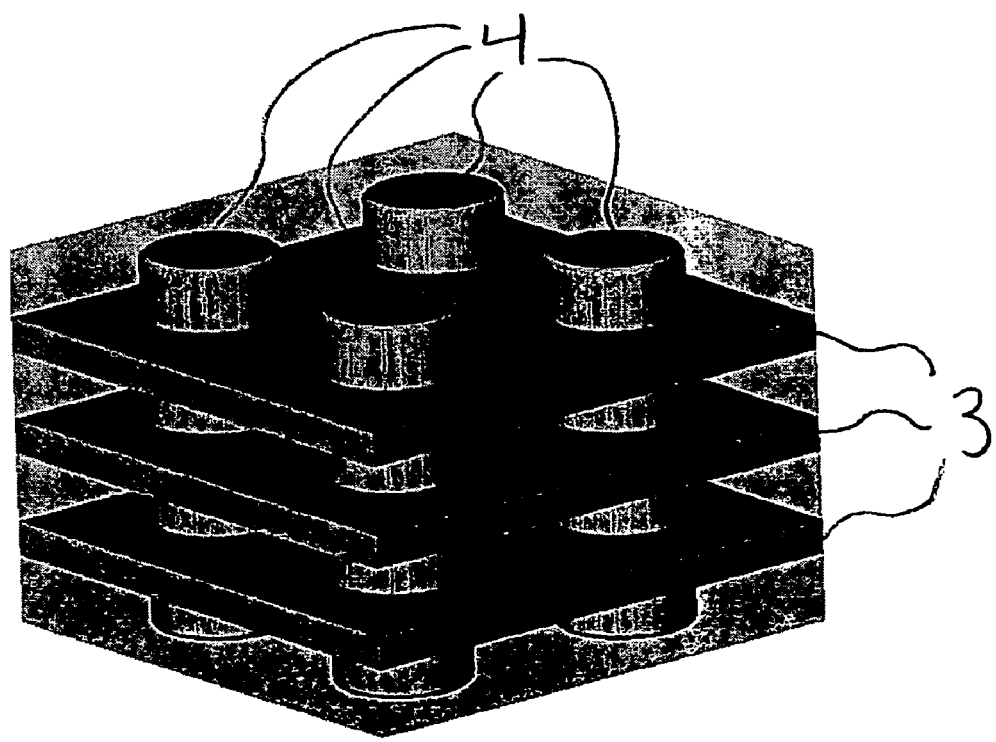
FIG. 10 shows an MRE device having a plate configuration of three plate MRE devices connected in series with the magnetic activation layers not shown.

FIG. 10 shows an embodiment of the plate configuration whereby three MRE-plate layers are arranged in series. There are three MRE layers 3, each controlled by eight magnetic nodes 4, four above and four below the MRE layer 3. The magnetic nodes are contained within one of the four magnetic activation layers that are not shown so that the magnetic nodes can be seen. The plate configuration can also be arranged in a parallel configuration or a combination of parallel and series configuration.

The figures do not show the presence of electrical wires connecting the electromagnets to the power supply. The electromagnets can all connect to the same wires leading from one power supply, or the electromagnets can have separate connections so that current to each magnet can be independently controlled.

Shell Configuration

The device can also be configured as a shell (not shown). A shell configuration can be any three-dimensional surface wherein the location of the magnetic nodes is defined by three spatial coordinates. In contrast, the magnetic nodes in a plate configuration are defined by two spatial coordinates.

The shell configurations can also be arranged in series, in parallel, or a combination thereof.

For each of the configurations, one advantage of using multiple MRE layers within one MRE device is that failure of any single magnetic node is not catastrophic because of the presence of additional MRE layers controlled by different magnets.

Details regarding how the MRE device is to be fixed to the inertial reference frame and contact the impinging vibration force, for each of the beam, shell and plate configurations, depends on the geometry of the inertial reference frame and direction of the impinging vibration force.

While particular embodiments of the present invention are described, it is to be understood that various changes, modifications and additions may be made within the scope of the present invention set forth in the following claims.

All references cited herein are hereby incorporated by reference to the extent that they are not inconsistent with the disclosure herein.

What is claimed is:

1. A vibration isolation device comprising:
   a. a magneto-rheological elastomer;
   b. wherein said magneto-rheological elastomer contains magnetizable particles aligned to dissipate a vibration disturbance; and
   c. a plurality of magnets positioned with respect to said magneto-rheological elastomer such that the magnets are capable of producing a controllable three-dimensional magnetic field throughout at least a portion of said magneto-rheological elastomer to thereby change the stiffness of said magneto-rheological elastomer, to simultaneously compensate for said vibration disturbance in one, two or three dimensions by applying a corresponding magnetic field in said one, two or three dimensions.

2. The device of claim 1 wherein said magnets comprise electromagnets.

3. The device of claim 1 further comprising:
   a. said magneto-rheological elastomer having an outward-facing top surface and outward-facing bottom surface;
   b. a magnetic activation layer connected to the outward-facing top surface of said magneto-rheological elastomer; and
   c. a magnetic activation layer connected to the outward-facing bottom surface of said magneto-rheological elastomer.

4. The device of claim 3 wherein one or more of said magnets is embedded within the magnetic activation layer.

5. The device of claim 3 wherein said magnetic activation layer is firmer than the magneto-rheological elastomer.

6. The device of claim 3 wherein said magnetic activation layer is less firm than the magneto-rheological elastomer.

7. The device of claim 6 wherein said magnetic activation layer is a magneto-rheological elastomer.

8. The device of claim 1 wherein said magnets are operably connected to a feedback system whereby said magnetic field is selected to optimize vibration isolation.

9. The device of claim 8 wherein at least one magnet has a different magnetic strength than at least one of the other magnets.

10. The device of claim 8 wherein said feedback system comprises a sensor that generates a signal based on a force impinging on said device, said signal communicated to a controller, said controller controlling the output of a second signal communicated to a power supply, said power supply generating a current to said electromagnets to vary stiffness of said magneto-rheological elastomer to compensate for said force.

11. The device of claim 10 wherein said sensor detects one or more of displacement, velocity and acceleration.

12. The device of claim 1 wherein said device is formed in a beam, plate or shell configuration.

13. The device of claim 12 wherein said device is a curved beam.

14. The device of claim 12 comprising a plurality of said devices connected to each other in series.

15. The device of claim 12 comprising a plurality of said devices connected to each other in parallel.

16. The device of claim 12 comprising a plurality of said devices connected to each other in series and parallel.

17. A vibration isolation device for dissipating a vibration disturbance, said device comprising:
   a. a plurality of magneto-rheological elastomer layers wherein each individual magneto-rheological elastomer layer is sandwiched between magnetic activation layers; and
   b. a plurality of magnetic nodes located within said magnetic activation layers to affect three-dimensional magnetic field strength within each of said magneto-rheological elastomer layers to simultaneously compensate for said vibration disturbance in one, two or three dimensions by applying a corresponding magnetic field in said one, two or three dimensions, wherein the magnetic field strength affected by each magnetic node can be different.

18. The device of claim 17 wherein said device further comprises an external encasement layer.

19. The device of claim 18 wherein the magnetic activation layer is a magneto-rheological elastomer having a percent weight of magnetizable particles, the external encasement layer is a magneto-rheological elastomer having a percent weight of magnetizable particles, wherein the percent weight of magnetizable particles in the magnetic activation layer is less than or equal to the percent weight of magnetizable particles in the external encasement layer.

20. The device of claim 17 wherein said device is a curved beam.

21. The device of claim 17 wherein said device is formed in a beam, curved beam, plate or shell geometry.

22. The device of claim 21 wherein said layers are connected in series.

23. The device of claim 21 wherein said layers are connected in parallel.

24. The device of claim 21 wherein said layers are connected in series and in parallel.

25. A method of controlling a variable-stiffness magneto-rheological elastomer in any direction in response to a vibrational disturbance generated by a shock event, said method comprising the steps of:
   a. communicating a signal from a sensor to a controller;
   b. determining from said signal a desired magneto-rheological elastomer stiffness and generating an electrical signal in response thereto; and
   c. communicating said electrical signal to a plurality of electromagnets operatively associated with said magneto-rheological elastomer, thereby generating a controllable three-dimensional magnetic field so as to vary the stiffness of said magneto-rheological elastomer to simultaneously compensate for said vibrational disturbance in one, two or three dimensions by applying a corresponding magnetic field in said one, two or three dimensions.

26. The method of claim 25 wherein said electrical signal provides increased vibration isolation energy dissipation relative to vibration isolation energy dissipation without said magnetic field.

27. The method of claim 25 further comprising compensating for device aging and history.

28. A vibration isolation device comprising:
   a. a magneto-rheological elastomer having an outward-facing top surface and an outward-facing bottom surface;
   b. a magnetic activation layer adjacent to the outward-facing top surface of said magneto-rheological elastomer;
   c. a magnetic activation layer adjacent to the outward-facing bottom surface of said magneto-rheological elastomer; and
   d. a plurality of magnets operably connected to said magneto-rheological elastomer such that said magneto-rheological elastomer can be activated by a controllable three dimensional magnetic field generated by said magnets to dissipate a vibration disturbance in one, two or three dimensions by applying a corresponding magnetic field in said one, two or three dimensions.

* * * * *

UNITED STATES PATENT AND TRADEMARK OFFICE
CERTIFICATE OF CORRECTION

PATENT NO.        : 7,086,507 B2
APPLICATION NO.   : 10/844040
DATED             : August 8, 2006
INVENTOR(S)       : Hitchcock et al.

It is certified that error appears in the above-identified patent and that said Letters Patent is hereby corrected as shown below:

On the title page, please chagne Item (75) Inventors to delete "Alan Fuchs, Reno, NV (US)"

Signed and Sealed this

Fifth Day of December, 2006

JON W. DUDAS
*Director of the United States Patent and Trademark Office*